US010167137B2

(12) United States Patent
Alexander et al.

(10) Patent No.: US 10,167,137 B2
(45) Date of Patent: Jan. 1, 2019

(54) FLAME RESISTANT VISCOSE FILTER APPARATUS AND METHOD

(75) Inventors: Glenn David Alexander, Dunedin (NZ); Joseph Anthony Salpietra, Shreveport, LA (US)

(73) Assignee: EFIP Holdings LP, Dunedin (NZ)

( * ) Notice: Subject to any disclaimer, the term of this patent is extended or adjusted under 35 U.S.C. 154(b) by 0 days.

(21) Appl. No.: 12/565,592

(22) Filed: Sep. 23, 2009

(65) Prior Publication Data

US 2010/0071327 A1 Mar. 25, 2010
US 2016/0362249 A9 Dec. 15, 2016

Related U.S. Application Data

(63) Continuation of application No. 12/430,650, filed on Apr. 27, 2009, now Pat. No. 8,277,530.

(60) Provisional application No. 61/099,688, filed on Sep. 24, 2008, provisional application No. 61/099,699, filed on Sep. 24, 2008.

(51) Int. Cl.
*B01D 46/00* (2006.01)
*B65D 88/74* (2006.01)
*B01D 39/16* (2006.01)
*D04H 1/488* (2012.01)
(Continued)

(52) U.S. Cl.
CPC ......... *B65D 88/741* (2013.01); *B01D 39/163* (2013.01); *B01D 39/1615* (2013.01); *D04H 1/4258* (2013.01); *D04H 1/4382* (2013.01); *D04H 1/488* (2013.01); *B01D 2239/064* (2013.01); *B01D 2239/08* (2013.01); *Y10T 156/10* (2015.01)

(58) Field of Classification Search
CPC .. F24B 1/00–1/28; B01D 46/10–46/26; B01D 1/00–2325/48; A47J 9/00–31/605; A47J 33/00–42/56; A47J 43/00–47/20
USPC ...... 55/512–514, 522–528, DIG. 5, DIG. 36; 427/350, 389.9, 401; 156/280, 326, 327, 156/328; 126/280, 299 R, 300–303, 126/299 C, 299 D, 299 E, 299 F; 210/680; 95/273–287
See application file for complete search history.

(56) References Cited

U.S. PATENT DOCUMENTS 1,757,690 A * 5/1930 Strindberg ...................... 55/492
2,332,519 A * 10/1943 Leonardson et al. ......... 527/205
(Continued)

FOREIGN PATENT DOCUMENTS

CA 2262821 A1 2/1998
DE 8022263 2/1981
(Continued)

OTHER PUBLICATIONS

Russell, S.J., "Handbook of Nonwovens," Woodhead Publishing in Textiles, 2007.*
(Continued)

*Primary Examiner* — T. Bennett McKenzie
(74) *Attorney, Agent, or Firm* — Baker Botts L.L.P.

(57) ABSTRACT

A filter assembly includes a filter pad comprising flame resistant viscose. The filter assembly also includes a bonding emulsion. The bonding emulsion may comprise casein resin. The bonding emulsion may additionally comprise acrylic resin. The filter assembly also includes a structural support. In particular embodiments, at least a portion of the fibers are treated with a solution that is fire resistant or fire retardant.

24 Claims, 4 Drawing Sheets

(51) Int. Cl.
*D04H 1/4258* (2012.01)
*D04H 1/4382* (2012.01)

(56) References Cited

U.S. PATENT DOCUMENTS

| | | | | |
|---|---|---|---|---|
| 2,664,172 | A | 12/1953 | Butterfield | |
| 2,809,715 | A | 10/1957 | Lemkey | |
| 3,015,367 | A * | 1/1962 | Smith et al. | 96/135 |
| 3,158,532 | A | 11/1964 | Pall et al. | |
| 3,388,536 | A | 6/1968 | Nash | |
| 3,925,137 | A * | 12/1975 | Kamei | 156/278 |
| 4,336,038 | A * | 6/1982 | Schultheiss et al. | 96/417 |
| 4,433,020 | A * | 2/1984 | Narukawa et al. | 428/113 |
| 4,455,237 | A | 6/1984 | Kinsley | |
| 4,517,308 | A | 5/1985 | Ehlenz et al. | |
| 4,689,058 | A * | 8/1987 | Vogt | B01D 39/163 55/486 |
| 4,883,507 | A * | 11/1989 | Rey et al. | 95/273 |
| 5,187,006 | A * | 2/1993 | Leighton et al. | 442/327 |
| 5,273,565 | A * | 12/1993 | Milligan et al. | 55/528 |
| 5,417,752 | A * | 5/1995 | Paren et al. | 106/166.82 |
| 5,635,005 | A * | 6/1997 | Saitoh et al. | 156/234 |
| 5,935,303 | A * | 8/1999 | Kimura | B01D 39/1615 264/441 |
| 6,099,901 | A | 8/2000 | Cronia et al. | |
| 6,293,983 | B1 * | 9/2001 | More | B01D 39/1615 55/486 |
| 7,338,702 | B2 * | 3/2008 | Swales et al. | 428/294.1 |
| 7,465,332 | B2 | 12/2008 | Randinelli | |
| 2003/0017129 | A1 | 1/2003 | Maleeny et al. | |
| 2004/0096629 | A1 * | 5/2004 | Aneja et al. | 428/182 |
| 2004/0116026 | A1 | 6/2004 | Kubose et al. | |
| 2004/0116028 | A1 * | 6/2004 | Bryner | 442/381 |
| 2004/0121114 | A1 * | 6/2004 | Piana | D06M 11/82 428/85 |
| 2005/0118919 | A1 | 6/2005 | Link et al. | |
| 2006/0042020 | A1 * | 3/2006 | Salmon et al. | 8/115.51 |
| 2006/0093870 | A1 * | 5/2006 | Davis | A47C 31/001 442/334 |
| 2006/0150339 | A1 | 7/2006 | McGuire et al. | |
| 2006/0194900 | A1 * | 8/2006 | Chow | B29C 43/003 524/9 |
| 2006/0228528 | A1 | 10/2006 | Link et al. | |
| 2006/0286884 | A1 | 12/2006 | Thioliere et al. | |
| 2007/0084786 | A1 * | 4/2007 | Smithies | 210/490 |
| 2007/0178788 | A1 | 8/2007 | Link et al. | |
| 2007/0245703 | A1 | 10/2007 | Randinelli et al. | |
| 2008/0022645 | A1 | 1/2008 | Skirius et al. | |
| 2009/0030131 | A1 * | 1/2009 | Fushitani | D01F 2/10 524/456 |

FOREIGN PATENT DOCUMENTS

| | | | | |
|---|---|---|---|---|
| DE | 8905395 | U1 | 6/1989 | |
| DE | 60221829 | | 5/2008 | |
| EP | 1762655 | A1 | 3/2007 | |
| EP | 1861524 | A2 | 12/2007 | |
| GB | 572899 | A | 10/1945 | |
| GB | 818 943 | A | 8/1959 | |
| GB | 818943 | | 8/1959 | |
| GB | 822175 | A | 10/1959 | |
| GB | 1 401 231 | A | 7/1975 | D21H 5/18 |
| GB | 2 290 727 | A | 1/1996 | B01D 53/04 |
| JP | S61220711 | | 10/1986 | |
| JP | WO 2007023777 | A1 * | 3/2007 | D01F 2/10 |
| WO | WO 98/45021 | | 10/1998 | B01D 29/56 |
| WO | WO 2007023777 | A1 * | 3/2007 | |
| WO | WO 2007/140302 | A2 | 12/2007 | B01D 71/40 |
| WO | WO2007140302 | A2 | 12/2007 | |
| WO | WO 2008/103736 | A1 | 8/2008 | B01D 50/00 |

OTHER PUBLICATIONS

Russell, S.J., "Handbook of Nonwovens," Woodhead Publishing in Textiles, 2007 (Russell).*

Notification of Transmittal of the International Search Report and the Written Opinion of the International Searching Authority, or the Declaration; International Application No. PCT/US2009/058183; International Filing Date Sep. 24, 2009, dated Feb. 5, 2010.

Invitation to Pay Additional Fees and, Where Applicable, Protest Fee; International Application No. PCT/US2009/057994; International Filing Date: Sep. 23, 2009, dated Feb. 19, 2010.

Notification of Transmittal of the International Search Report and the Written Opinion of the International Searching Authority, or the Declaration; International Application No. PCT/US2009/057994; International Filing Date Sep. 23, 2009, dated Jul. 14, 2010.

Intellectual Property Office of New Zealand, Examination Report for New Zealand Patent Application No. 591766, dated Mar. 27, 2012.

European Patent Office, Notification of Transmittal of the International Search Report and the Written Opinion of the International Searching Authority, or the Declaration for International Application No. PCT/US2009/058186, dated Feb. 24, 2010.

Canadian Intellectual Property Office, Office Action for Application No. 2,737,789, dated Feb. 26, 2016.

Intellectual Property India Search Report in Indian Application No. 2710/DELNP/2011, dated Mar. 28, 2018, 8 pages.

European Patent Office Extended Search Report in EP Application No. 17190107.7-1009/3315184 dated May 7, 2018, 9 pages.

* cited by examiner

FLAME RESISTANT VISCOSE FILTER APPARATUS AND METHOD

RELATED APPLICATIONS

This application is a continuation of U.S. patent application Ser. No. 12/430,650, filed on Apr. 27, 2009, and claims the benefit of U.S. Provisional Patent Application Nos. 61/099,688, filed on Sep. 24, 2008, and U.S. Provisional Patent Application No. 61/099,699, filed on Sep. 24, 2008, which are each incorporated herein by reference.

TECHNICAL FIELD OF THE INVENTION

The teachings of the present disclosure relate generally to exhaust filtration in ventilation systems, and more particularly to a flame resistant viscose filter apparatus and method.

BACKGROUND OF THE INVENTION

The exhaust units used in food preparation and commercial kitchens include devices such as air extractor hoods and air conditioning units. The traditional exhaust systems include filter elements that use a variety of metal or flame listed baffles, as identified in the various U.S. or State Codes, for the purpose of blocking flames from penetrating the exhaust system and diverting grease from building up in the ductwork of the exhaust system.

The exhausted air in the food preparation environment is typically laden with greasy vapor and unwanted odors and substances. The grease and unwanted substances should be trapped by the filters before passing through to the ducting to be released to the environment. Grease may collect on ductwork or pass into the environment. In addition, the grease and others substances contaminate the hood and fan and these require constant cleaning to remove the grease. As the filters get quickly filled with grease they require regular cleaning. Moreover, the grease in the ducting constitutes a major fire hazard as ducting fires are a constant concern.

SUMMARY OF THE INVENTION

The present disclosure provides a flame resistant exhaust filter apparatus, system and method that substantially eliminates or reduces at least some of the disadvantages and problems associated with previous exhaust filtration system and methods.

In accordance with one embodiment of the present disclosure, a filter assembly comprises a filter pad comprising flame resistant viscose. The filter assembly also comprises a bonding emulsion. Additionally, the filter assembly may also comprise a structural support. In particular embodiments, the filter assembly may also comprise flame resistant viscose blended with synthetic fibers. In particular embodiments, the filter assembly may also comprise flame resistant viscose blended with wool fibers. In particular embodiments, the bonding emulsion may comprise casein resin, acrylic resin, starch, protein, and/or polylactic acid.

In accordance with another embodiment of the present disclosure, a method of manufacturing a filter assembly comprises forming a filter pad comprising flame resistant viscose. The method also includes applying a bonding emulsion to the filter pad. In particular embodiments, the method also includes coupling the filter pad to a structural support. The method may also include forming a filter assembly, wherein the filter assembly comprises flame resistant viscose blended with synthetic fibers. The method may also include forming a filter assembly, wherein the filter assembly comprises flame resistant viscose blended with wool fibers. In particular embodiments, the method may include applying a bonding emulsion to the filter pad, wherein the bonding emulsion may comprise casein resin, acrylic resin, starch, protein, and/or polylactic acid.

In accordance with yet another embodiment of the present disclosure, a method of manufacture includes carding wool fibers into a fiber web. The method also includes blending flame resistant viscose with the fiber web. The method additionally includes needle punching the fiber web into a non-woven blanket. The method further includes applying a bonding emulsion to the non-woven blanket.

Technical advantages of particular embodiments of the present disclosure include efficiently removing or reducing grease particulates from grease-laden vapor or air emanating from kitchen equipment. Accordingly, baffle filters and connecting ductwork may remain cleaner for a longer period of time, thereby providing an effective fire barrier, since the fuel source (e.g., grease particulates) is partially or substantially removed from the airflow prior to reaching any baffle filters and/or ductwork.

Technical advantages of particular embodiments of the present disclosure also include the ability to easily remove and replace a grease-saturated filter assembly, eliminating the need for costly and time-consuming cleaning of traditional baffle or other non-disposable filters. Consequently, particular embodiments of the present invention provide a disposable and replaceable filter for grease-laden vapor and air emanating from kitchen equipment. Additionally, the filter assembly may be bio-degradable, allowing for safe, ecologically-friendly, and cost-effective disposal of used filter assemblies.

Other technical advantages of particular embodiments of the present disclosure include reducing the likelihood of damaging fires caused by flames interacting with grease build-up in traditional filters. In particular embodiments, a fire-resistant or fire-retardant chemical may be applied to a filter assembly. Thus, the likelihood of flames or excessive heat buildup causing a conflagration in a filter assembly may be substantially reduced or eliminated altogether. Additionally, embodiments of the present disclosure may be formed from flame resistant viscose, which is extremely heat and flame resistant. Such heat and flame resistant properties may substantially reduce or eliminate damage to the filter assembly or surrounding vent hood in situations in which a filter assembly may come into contact with extreme heat, open flames, or grease flare-ups.

Other technical advantages of particular embodiments of the present disclosure include enhanced self-support of the filter assembly. In particular embodiments, the flame resistant viscose and wool blend is much stronger and more self-supporting than other wool-based filters. This provides particular embodiments of the present disclosure with the benefit of requiring less support in the filter supporting assembly in the ventilation hood. Moreover, the wool-flame resistant viscose blend is more structurally firm than other wool-based filters, and will lend itself to automated packing and processing more readily than primarily wool-based filters.

Other technical advantages of the present disclosure will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE INVENTION

Figure 1:
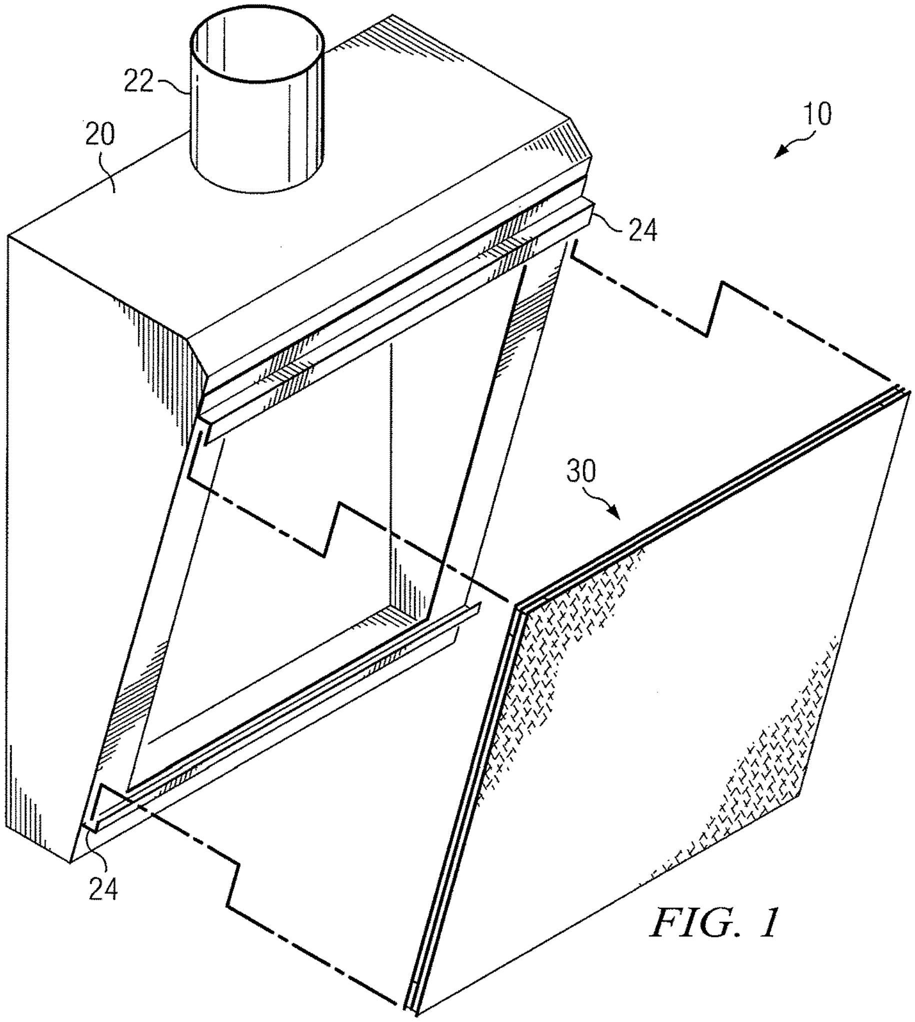
FIG. 1 illustrates an exhaust filtration system, including a vent hood and a filter assembly.

FIG. 1 illustrates a particular embodiment of an exhaust filtration system 10. Exhaust filtration system 10 may include vent hood 20 and filter assembly 30. To filter grease, vapor and other particulates arising from kitchen equipment, filter assembly 30 may be mounted in vent hood 20. In particular embodiments, filter assembly 30 may be formed of materials such that it is generally "self-supporting," meaning that it does not require metal filter support frames, frame covers or heat shields. Filter assembly 30 can be formed in a variety of ways using a variety of materials that may result in a filter assembly 30 that is either reusable or disposable. In such embodiments, filter assembly 30 may be easily mounted, as discussed further below, in vent hood 20 by simply sliding it into place on brackets or some other similar fastening or support system within vent hood 20.

Vent hood 20 may represent any ventilation equipment designed or configured to exhaust heat, odors, grease, vapor, grease-laden vapor, and/or other particulates away from kitchen equipment. For example, in particular embodiments, vent hood 20 may be positioned in proximity to a fryer, grill, griddle, or oven, whether in a home or commercial setting. In particular embodiments, vent hood 20 may be positioned above the relevant kitchen equipment, so that naturally rising heat and vapor passes through or is sucked into vent hood 20 and filter assembly 30. Mounting brackets 24 may also be provided as part of vent hood 20. For purposes of this disclosure, "mounting brackets" may refer to clips, brackets, grooves, clasps, and/or any other type of holding mechanism to hold or secure filter assembly 30 within or on a portion of vent hood 20. Mounting brackets 24 may be formed of practically any material that will support the weight of filter assembly 30 and hold filter assembly 30 in place within the exhaust hood. In accordance with a particular embodiment of the present disclosure, to meet various codes and regulations governing exhaust hoods, the mounting brackets may be comprised of stainless steel and/or another non-combustible material. Mounting brackets 24 may be designed to practically any shape to hold filter assembly 30 in place and maintain a sufficient seal within the vent hood 20 aperture. In particular embodiments of the present disclosure, the mounting brackets may be made of stainless steel and formed into the shape of "Z" or "U" to hold filter assembly 30 in place, and allow for simplified removal and/or replacement of filter assembly 30.

Vent hood 20 may additionally include one or more baffle filters (not shown in FIG. 1), which may be configured with a series of overlapping baffles. The overlapping baffles may force the grease-laden exhaust vapor to make several changes in direction within the grease filter. The grease is dismissed from the air stream by centrifugal force and accumulates within the baffle interior. In particular embodiments, filter assembly 30 may be positioned in front of one or more baffle filters, such that grease-laded vapor or exhaust air is first filtered by filter assembly 30 before passing through one or more baffle filters. In general, however, filter assembly 30 and one or more baffle filters may be disposed or positioned in any appropriate relative arrangement, including any adjacent, conjunctive or separated arrangement. Vent hood 20 may additionally include exhaust conduit 22, which may connect components of vent hood 20 to ductwork that transports filtered exhaust air to other portions of a ventilation system. In particular embodiments, the filtered air may be carried through exhaust conduit 22 to ductwork that ultimately transports the filtered exhaust air to the outside environment. In other particular embodiments, the filtered exhaust air may be carried through exhaust conduit 22 and released into the immediate interior kitchen environment. Particular embodiments of vent hood 20 may include one or more fan assemblies that create pressure to facilitate the movement of air and/or vapor through filter assembly 30 and through exhaust conduit 22.

Filter assembly 30 is positioned or disposed within or on vent hood 20, and filters heat, odors, grease, vapor, grease-laden vapor, and/or other particulates or contaminants emanating from kitchen equipment. As discussed further below with respect to FIG. 2, filter assembly 30 may be at least partially constructed of bio-degradable wool fiber, fire resistant viscose and a bonding emulsion blend to which a fire retardant solution may be applied. Filter assembly 30 may be removably coupled to vent hood 20 by mounting brackets 24, or any other clips, brackets, grooves, clasps, or any other type of holding mechanism. Thus, as a first filter assembly 30 becomes partially or fully saturated with grease, vapor, and/or other particulates, the first filter assembly 30 may be loosened and removed from one or more holding mechanisms, and a second clean or unused filter assembly 30 may be removably coupled to vent hood 20 with the holding mechanism. Consequently, filter assembly 30 may be disposable and interchangeable with other filter assemblies 30. Moreover, a particular vent hood 20 may accommodate or support a plurality of filter assemblies 30. A plurality of filter assemblies 30 may be placed or disposed in vent hood 20 in any appropriate arrangement, including, but not limited to, side by side, separated, or "back to back," such that a given volume of air or grease-laden vapor flows through each filter assembly 30.

Figure 2:
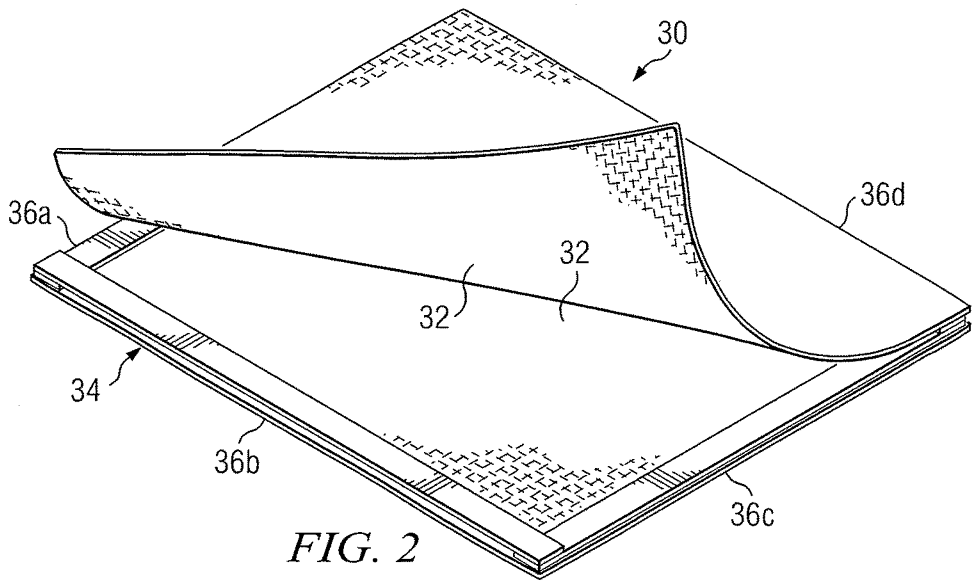
FIG. 2 illustrates the filter assembly of FIG. 1 in more detail, including aspects of an embodiment of the present disclosure.

FIG. 2 illustrates in greater detail filter assembly 30 as shown in FIG. 1. As noted above with respect to FIG. 1, filter assembly 30 may be positioned or disposed within or on vent hood 20, and filters heat, odors, grease, vapor, grease-laden vapor, and/or other particulates or contaminants emanating from kitchen equipment. To facilitate positioning within vent hood 20 in order to capture and/or remove grease or vapor from exhaust air, particular embodiments of filter assembly 30 may include filter pad 32 and support structure 34. In particular embodiments, filter pad 32 may facilitate the capture and removal of grease, grease-laden vapor, and other particulates from the air. For example, filter pad 32 may be formed from fibers that are capable of collecting and/or holding grease particulates from air that travels through the filter pad 32. Filter pad 32 may also be formed from fibers that are heat and flame resistant. For example, filter pad 32 may be formed from a blend of wool fibers and flame resistant (FR) viscose. Additionally, in particular embodiments, the filter pad 32 may be formed from wool, FR viscose, and/or other fibers bonded together with a bonding emulsion that may contain additional additives such as fire retardant, fire suppressant, anti-microbial, anti-bacterial, color dyes, etc. As shown in FIG. 2, filter assembly 30 may include two filter pads 32 couple to support structure 34. In general, however, filter assembly 30 may include any appropriate number of filter pads 32, depending on the operating conditions of exhaust filtration system 10.

Because wool is naturally oleophilic, wool fiber has the ability to at least partially capture and/or remove grease from grease-laden vapor or air emanating from kitchen equipment. Accordingly, at least a portion of or substantially all of the grease or other particulates are captured at filter assembly 30 by filter pad 32 before the remaining air passes through a baffle filter and/or exhaust conduit 22. Particular embodiments of filter assembly 32 may include fibers other than wool. Thus, filter assembly 30 may be manufactured using one or more (e.g., a blend) of various fibers. For example, at least three different types of fibers may be used: (i) natural fibers, (ii) synthetic fibers, and/or (iii) hybrid fibers. For the purposes of this disclosure, "natural" fibers generally refers to fibers that are derived from nature and include wool (e.g., sheep's wool or any other animal hair), cotton, linen, hemp, manila, flax, plant fibers, jute sisal, etc. For the purposes of this disclosure, "synthetic" fibers generally refers to fibers that are man-made, and include nylon, polyester, acrylic, polypropylene, polyethylene, polystyrene, flame resistant modified acrylic, etc. For the purposes of this disclosure, "hybrid" fibers generally refers to fibers that are derived from nature but materially modified by man, and include viscose, rayon, PLA, PLA flame resistant polymers, biodegradable flame resistant polymers, flame resistant rayon, synthetic fiber derived from a natural source, fibers that are derived from corn starch, etc. At least some of the above referenced fibers may also be used in a flame resistant form in which a flame resistant additive is impregnated into the fibers. Additionally, filter assembly 30 may be manufactured using any of the natural, synthetic, or hybrid fibers alone, or in combination with one or more other fibers.

In kitchens, some filters may be installed in exhaust hoods above various fat fryers, grills, griddles and ovens where excess heat and flame can occur. Unless stainless steel heat shields are used there is the possibility that concentrations of heat (e.g., from exhaust of an oven or steamer), will degrade the wool fibers and cause a hole to form in the filter. Similarly, flames will make holes in the filter if they come in direct contact with the filter which can happen above griddles and grills with a grease flare-up. This is a major draw back as a hole in the filter renders it ineffective and means it needs to be changed. Protein-based filters especially may degrade when exposed to heat.

Consequently, filter pad 32 may, in particular embodiments, be formed from a blend of wool and/or other fibers, and FR viscose. Flame resistant viscose is extremely heat and flame resistant and will only degrade under extreme conditions of heat and flame. Filter pad 32 may be formed using wool and FR viscose blended in any ratio. For example, in particular embodiments, filter pad 32 may be formed from a blend of 95% wool and 5% FR viscose. In other particular embodiments, filter 32 may be formed from a blend of 5% wool and as much as 95% FR viscose. Filter pad 32 may also be formed from FR viscose alone, i.e., 100% FR viscose. In general, however, filter pad 32 may be formed from any appropriate ratio of wool to FR viscose, depending on the particular operating characteristics or environment of exhaust filtration system 10.

Filter pad 32 may additionally be formed by applying a bonding emulsion to a wool-FR viscose blend. For example, the following describes blends that may be used in accordance with a particular embodiment of the present disclosure:

1. 50% wool and 50% 8-9 denier FR viscose bonded with a biodegradable acrylic bonding emulsion that has been treated with a fire resistant solution;
2. 100% 8-9 denier FR viscose bonded with a biodegradable acrylic bonding emulsion that has been treated with a fire resistant solution;
3. 50% wool/25% 8-9 denier FR viscose/25% 2 denier FR viscose bonded with a biodegradable acrylic bonding emulsion that has been treated with a fire resistant solution; or
4. 100% wool bonded with a biodegradable acrylic bonding emulsion that has been treated with a fire resistant solution. For purposes of this disclosure, "denier" is a unit of measurement of linear density of textile fiber mass, calculated as one gram per nine-thousand meters.

Additionally, filter pad 32 may be formed from a wool-FR viscose blend that is further blended with other fibers, either natural, synthetic or both, which can impart flame resistant or structural properties. Examples of such additional natural and synthetic fibers include, but are not limited to, rayon, fire resistant rayon, fire resistant modacrylic, polylactic acid fire resistant polymers, biodegradable fire resistant polymers, plant fibers or fire resistant natural fibers derived from plant fibers (i.e. jute, flax, hemp, sisal, cotton, and/or manila). Filter pad 32 may be formed using any of the natural, hybrid, or synthetic fibers described herein alone, or in combination with one or more of the other fibers. In particular embodiments, flame resistant rayon may be the only type of fiber used in the formation of filter pad 32. Additionally, the fibers may be blended with wool and/or viscose in any appropriate combination or ratio.

As noted above, filter pad 32 may be formed by applying a bonding emulsion to a wool-FR viscose blend. The bonding emulsion used in conjunction with wool and/or FR viscose fibers may be configured according to the particular environment in which the exhaust filtration system 10 is installed, or the needs of the overall ventilation system. In particular embodiments, the bonding emulsion may comprise a blend of one or more natural or synthetic bonding substances. For example, the bonding emulsion may comprise an acrylic resin and casein resin blend. The bonding emulsion may also comprise a starch and protein blend. The bonding emulsion may also comprise a protein and casein resin blend. The bonding emulsion may also comprise a casein and polylactic acid (PLA) blend. The proportion of wool fibers and FR viscose to bonding emulsion may vary depending on the particular bonding emulsion used, the particular ratio of wool to FR viscose, the environment in which exhaust filtration system 10 operates, and/or any other considerations, factors, or variables. In particular embodiments, filter pad 32 may include up to 90% scoured wool and 10% bonding emulsion. In general, the various acrylic resin, casein resin, starch, protein, and polylactic acid substances may be inter-mixed and blended with each other in any appropriate combination and in any appropriate proportions.

In particular embodiments, the bonding emulsion may be designed so that it will break down over time when the filter is disposed of after use (i.e., is biodegradable). One or more of the fibers, including, but not limited to wool fibers and FR viscose, which may be made from wood, may also be biodegradable. While this bonding solution may be made from acrylic co-polymers and casein, it may also be made with other natural occurring and biodegradable (or other) binders which are also biodegradable, including, but not limited to, starch and protein adhesives. Synthetic bonding components which have biodegradable properties including, but not limited to, polylactic acid (PLA), may also be used. Hydrogen-bonding may also be used in the manufacture and/or assembly of filter assembly 30, since, in particular embodiments it may be used to bind certain cellulose non-woven materials. Thus, the filter assembly 30 may be designed to be fully biodegradable and, as such, can be easily disposed of while minimally affecting the environment.

Additionally, in particular embodiments, a flame retardant solution may be applied to the wool fibers, the wool-FR viscose blend, the bonding emulsion, or the wool-FR viscose and bonding emulsion blend, to provide resistance to flames, fire, or heat. While wool is naturally flame resistant, in a configuration in accordance with the teachings of this disclosure, wool fibers may be exposed to higher concentrations of oxygen from the air, making combustion a possibility in certain conditions. Thus, a flame retardant may be applied to further prevent or reduce combustion, charring, or other deleterious consequences of interactions with fire. For example, in embodiments of exhaust filtration system 10 in which vent hood 20 and filter assembly 30 are positioned over an open flame, or positioned in an area where flames may occur, the flame retardant solution may provide filter assembly 30 with more resistance to flames or fire than would be the case if a fire retardant solution were not applied to filter assembly 30. Flame resistant properties of filter assembly 30 may be particularly useful in embodiments of exhaust filtration system 10 associated with a grill, griddle, fryer and/or oven. Additionally, the filter may also act as a flame barrier to other components of vent hood 32, such as exhaust conduit 22 and associated ductwork. In particular embodiments, however, filter assembly may be formed without adding a flame retardant compound, depending on the flame resistance of the fiber blend used or other appropriate variables or conditions.

Support structure 34 is designed to add structure and rigidity to filter assembly 30. In particular embodiments, support structure 34 may include four sides 36 (top 36*a*, bottom 36*b*, left 36*c* and right 36*d*). In other particular embodiments, support structure 34 may have fewer or additional sides. In other particular embodiments, support structure 34 may be rounded or oblong to support a rounded or oblong filter assembly 30. Additionally, support structure 34 may be made of practically any material. For example, support structure 34 may be made of a natural, bio-degradable material that is lightweight and flame-resistant. Support structure 32 could be made of practically any material that will pass any required regulatory codes. Support structure 34 may also include any number of horizontal, vertical and/or diagonal supports of practically any size or configuration. Functionally, it is beneficial for support structure 34 to add shape and structure to filter assembly 30 with relatively little added weight and/or very little added static pressure. Thus, structural support may be made of any light-weight, structurally sound biodegradable material. In particular embodiments, support structure 34 may represent a box frame disposed between one or more filter pads 32. In such embodiments, the particular filter pads 32 may be held together with a heat-resistant glue. Both sides of support structure 34 may be coated with a heat-resistant glue which results in the components being held firmly together when pressure is applied to the unit to compress filter assembly 30. In other embodiments, support structure 34 may represent a frame that surrounds one or more filter pads 32, which are held within one or more grooves or slots in sides 36*a*, 36*b*, 36*c*, and/or 36*d*, or are held between glued edges of support structure 34.

In accordance with particular embodiments of the present disclosure, filter assembly 30 may vary in weight from 50 grams/square meter to 500 grams/square meter ("gsm"). However, particular embodiments of filter assembly 30 may weigh from 150 gsm to 250 gsm. Other particular embodiments of filter assembly may weigh from 100 gsm to 450 gsm. Additionally, in particular embodiments of exhaust filtration system 10 in which two filter pads 32 are combined in the manufacture of filter assembly 30, each filter pad 32 may weigh between 50 gsm and 150 gsm each, resulting in a combined weight of between 100 gsm and 300 gsm. For purposes of this disclosure, grams/square meter may refer to a dry mass weight. Additionally, filter assembly 30 may have a loft of approximately 10 mm to 30 mm, depending on the loft of the type of wool and FR viscose used, as this imparts loft and resilience to compression as part of its natural characteristics. Additionally, in particular embodiments of exhaust filtration system 10 in which two filter pads 32 are combined in the manufacture of filter assembly 30, each filter pad 32 may have a loft of approximately 12 mm to 15 mm, thus producing a combined assembled loft of approximately between 24 mm to 30 mm. The volume of air flowing through filter assembly 30 contributes to the efficient and effective use of the filter. The wool imparts loft and openness to the structure which allows sufficient air to pass through during operation. Although the materials, substances, methods, processes, and solutions have been described herein in connection with operation in an exhaust filtration system, some or all of the materials, substances, methods, processes, and solutions may additionally provide benefits in connection with insulation. For example, FR viscose is extremely heat and flame resistant and will only degrade under extreme conditions of heat and flame. Thus, the wool-FR viscose and/or fire resistant solution blend may be utilized in flame resistant clothing for firemen, welders, military and other workers in severe heat or flame conditions. Additionally, a wool-FR viscose blend may provide benefits in insulating appliances, homes, or any other device or structure where it is desirable to provide heat or flame resistance. In such embodiments, the loft and/or densities of filter pad 32 may be substantially higher, because there may be no need for any airflow.

A particular method that may be used to manufacture filter assembly 30 in accordance with a particular embodiment of the present disclosure is now described. Scoured wool may be opened to enable easier processing. The scoured wool may then be blended with the FR viscose or similar fiber as a pre-blend, then transferred to be put through a non-woven carding machine which further opens and aligns the filter blend fibers. The card makes the fiber blend into a fiber web which is then layered using a cross lapping machine into a wool wadding. The lapping and carding helps to ensure the wool fibers are aligned correctly so that when the wool wadding is sprayed with binder, the final filter will have sufficient loft and height. In particular embodiments, the wool-FR viscose blend filter may be needle punched into a non-woven blanket. Other non-woven processes, such as needling, thermo bonding, air laid, spunbond and/or other non-woven technology could be used to form the wadding/blanket in other embodiments.

At this stage a bonding emulsion may be applied by spraying the top and the bottom of the wadding with a spray mix. The emulsion is applied in a diluted form to allow penetration through the wadding. As the thickness of the wadding and grams per square meter can vary, the amount of bonding emulsion will also vary, so that it matches what is required to sufficiently bond the filter blanket and impart the desired physical properties. A flame retardant compound or solution may also be applied at this stage. In particular embodiments, the flame retardant compound is mixed with the bonding emulsion to provide even and thorough penetration through the wadding. The flame retardant compound may be diluted with water in a 50%/50%, or any other appropriate ratio. In addition, the bonding emulsion may include an antimicrobial and antibacterial agent added to it as well as an approved dye to dye the filter to the desired color. In particular embodiments, a vacuum positioned in proximity to the filter may provide unidirectional pressure to assist the bonding emulsion, flame retardant compound, antimicrobial agent and/or antibacterial agent in penetrating the wadding.

The spray bonded wadding may then be passed through an oven that has an ambient internal temperature of approximately between 280 and 305 degrees Fahrenheit to drive off the water and cure the bonding resins and/or flame retardant compound. In particular embodiments, a second application of flame retardant compound may be applied to the wadding. As with the first application, the flame retardant compound may be diluted with water and sprayed onto the wadding to allow penetration through the wadding. The flame retardant may be diluted in water in any appropriate ratio, including, but not limited to 50% flame retardant and 50% water. After an appropriate soaking period, the wadding may travel a second time through an oven that has an ambient internal temperature of approximately between 280 and 305 degrees Fahrenheit to again dry the water and cure the bonding resins and/or flame retardant compound.

The resultant wadding may then be rolled into rolls and allowed 24 hours to fully cure and the binder to be fully effective. During this time the wool or other constituent fibers may absorb moisture from the atmosphere.

The resultant wadding may then be made into rolls cut at specific widths. These rolls are then cut into the filter panels and press packed into packages of, for example, 24 filters. The resulting filter may be supplied in either rolls or cut panels depending on the installation requirements. The most common method would be to fix the wool filter into frame which may be installed above a ventilation hood. The frame assembly may also have a front cover to support the filter. In addition where there is excessive heat and flame a shield may be placed over the filter frame assembly.

Figure 3:
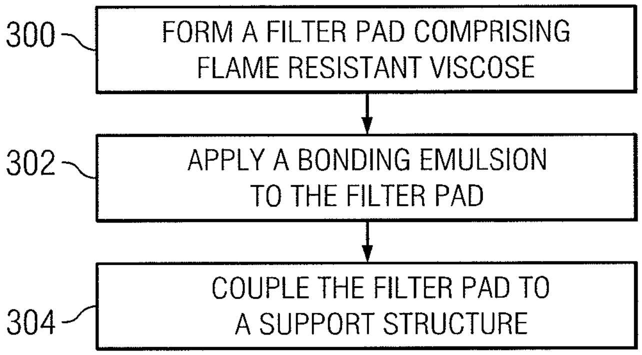
FIG. 3 is a flow chart illustrating a method of manufacturing a particular embodiment of the filter assembly of FIG. 2.

FIG. 3 is a flowchart illustrating a method of manufacturing the filter assembly 30 illustrated in FIG. 2. Operation, in the illustrated example, begins at step 300, in which a filter pad comprising flame resistant viscose is formed. As described above with respect to FIG. 2, flame resistant viscose is extremely heat and flame resistant and will only degrade under extreme conditions of heat and flame. In particular embodiments, flame resistant viscose may be blended with wool fibers to form the filter pad. Filter pad 32 may be formed using wool and FR viscose blended in any ratio. For example, in particular embodiments, filter pad 32 may be formed from a blend of 95% wool and 5% FR viscose. In other particular embodiments, filter 32 may be formed from a blend of 5% wool and as much as 95% FR viscose. Filter pad 32 may also be formed from FR viscose alone, i.e., 100% FR viscose. In general, however, filter pad 32 may be formed from any appropriate ratio of wool to FR viscose, depending on the particular operating characteristics or environment of exhaust filtration system 10. Additionally, at least three different types of fibers may be used in forming a filter pad: (i) natural fibers, (ii) synthetic fibers, and/or (iii) hybrid fibers. Filter pad 32 may be formed using any of the natural, synthetic, or hybrid fibers alone, or in combination with one or more other fibers.

At step 302 a bonding emulsion is applied to the filter pad. In particular embodiments, the bonding emulsion may comprise casein resin, acrylic resin, or a blend of one or more natural or synthetic bonding substances. For example, the bonding emulsion may comprise an acrylic resin and casein resin blend. The bonding emulsion may also comprise a starch and protein blend. The bonding emulsion may also comprise a protein and casein resin blend. The bonding emulsion may also comprise a casein and polylactic acid (PLA) blend. The proportion of wool fibers to bonding emulsion may vary depending on the particular bonding emulsion used, the environment in which exhaust filtration system 10 operates, and/or any other considerations, factors, or variables. In general, the various acrylic resin, casein resin, starch, protein, and polylactic acid substances may be inter-mixed and blended with each other in any appropriate combination and in any appropriate proportions, and applied to the fibers.

At step 304 the filter pad is coupled to a support structure. As described above with respect to FIG. 2, support structure 34 is designed to add structure and rigidity to filter assembly 30. Support structure 34 may comprise any appropriate lightweight, flame-resistant biodegradable material suitable to add structure to filter assembly 30. Additionally, support structure 34 may be shaped into any appropriate form suitable to perform the described functions, including rectangular, square, round, or any other multi-sided shape. Support structure 34 may also include any number of horizontal, vertical and/or diagonal supports of practically any size or configuration. In particular embodiments, support structure 34 may represent a box frame disposed between one or more filter pads 32. In such embodiments, the particular filter pads 32 may be held together with a heat-resistant glue. Both sides of support structure 34 may be coated with a heat-resistant glue which results in the components being held firmly together when pressure is applied to the unit to compress filter assembly 30. In other embodiments, support structure 34 may represent a frame that surrounds one or more filter pads 32, which are held within one or more grooves or slots in sides 36*a*, 36*b*, 36*c*, and/or 36*d*, or are held between glued edges of support structure 34.

The steps illustrated in FIG. 3 may be combined, modified, or deleted where appropriate, and additional steps may also be added to those shown. Additionally, the steps may be performed in any suitable order without departing from the scope of the present disclosure.

Figure 4:
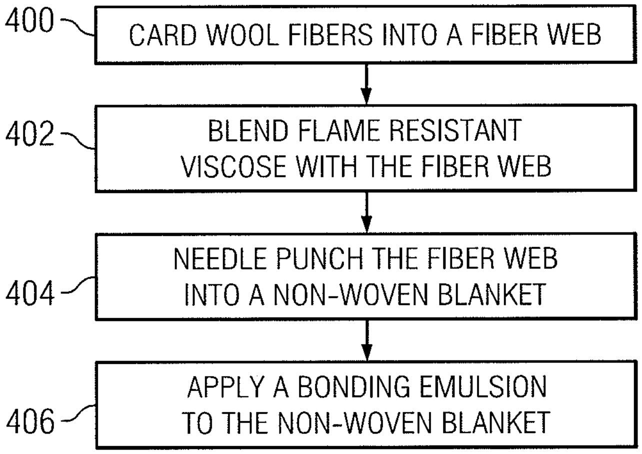
FIG. 4 is a flow chart illustrating a method of manufacture in accordance with a particular embodiment of the present disclosure.

FIG. 4 is a flowchart illustrating a particular method of manufacture in accordance with a particular embodiment of the present disclosure. Operation, in the illustrated example, begins at step 400, with wool fibers being carded into a fiber web. As discussed above, scoured wool may be opened to enable easier processing, then put through a non woven carding machine which further opens and aligns the wool fibers. The card makes the wool into wool web which is then layered using a cross lapping machine into a wool wadding. The lapping and carding is helpful to ensure the wool fibers are aligned correctly so that when the wool wadding is sprayed with binder that the final filter will have sufficient loft and height.

At step 402, flame resistant viscose is blended with the fiber web. In particular embodiments, flame resistant viscose may be blended with wool or other fiber as a pre-blend, then transferred to be put through a non-woven carding machine which further opens and aligns the filter blend fibers. In particular embodiments, flame resistant viscose may be carded concurrently, so that the separate fibers are blended together.

In step 404, the fiber web is needle punched into a non-woven blanket. Other non-woven processes, such as needling, thermo bonding, air laid, spunbond and/or other non-woven technology could be used to form the wadding/blanket in other embodiments.

In step 406, a bonding emulsion is applied to the fiber web. In particular embodiments, the top and the bottom of the fiber web may be sprayed with a blend of bonding emulsion and flame retardant. In particular embodiments, the flame retardant compound is mixed with the bonding emulsion to provide even and thorough penetration through the wadding. The flame retardant compound may be diluted with water in a 50%/50%, or any other appropriate ratio. In particular embodiments, the bonding emulsion may comprise casein resin. The bonding emulsion may also comprise, alone or in combination, acrylic resin, starch and protein, protein and/or polylactic acid. Additionally, the bonding emulsion or flame retardant compound may be applied in a diluted form to allow penetration through the wadding. As the thickness of the wadding and grams per square meter can vary the amount of bonding emulsion will also vary, so that it matches what is required to sufficiently bond the filter blanket and impart the desired physical properties. In addition, the bonding emulsion may include an antimicrobial and antibacterial agent added to it as well as an approved dye to dye the filter to the desired color. In particular embodiments, a vacuum positioned in proximity to the filter may provide unidirectional pressure to assist the bonding emulsion, flame retardant compound, antimicrobial agent and/or antibacterial agent in penetrating the wadding. The spray bonded wadding may then be passed through an oven that has an internal ambient temperature of approximately between 280 and 305 degrees Fahrenheit to drive off the water and cure the bonding resins. In particular embodiments, an additional application of flame resistant compound may be applied subsequent to the filter pad passing through an oven. In such embodiments, the filter pad may then travel a second time through an oven that has an internal ambient temperature of approximately between 280 and 305 degrees Fahrenheit.

The steps illustrated in FIG. 4 may be combined, modified, or deleted where appropriate, and additional steps may also be added to those shown. Additionally, the steps may be performed in any suitable order without departing from the scope of the present disclosure.

The present disclosure is directed to grease removal apparatus, systems and methods. A particular embodiment of the present disclosure includes a filter assembly that may be referred to herein as a Disposable Grease Removal Device ("DGRD"), and may be used in, for example, kitchen exhaust systems. In particular embodiments, the DGRD may be formed of materials such that it is generally "self-supporting", meaning that it does not require metal filter support frames, frame covers or heat shields. The DGRD can be formed in a variety of ways using a variety of materials that may result in a DGRD that is either reusable or disposable. In such embodiments, the DGRD can be easily mounted in the exhaust hoods by simply sliding it into place on brackets or some other similar fastening or support system within the exhaust hood.

Figure 5:
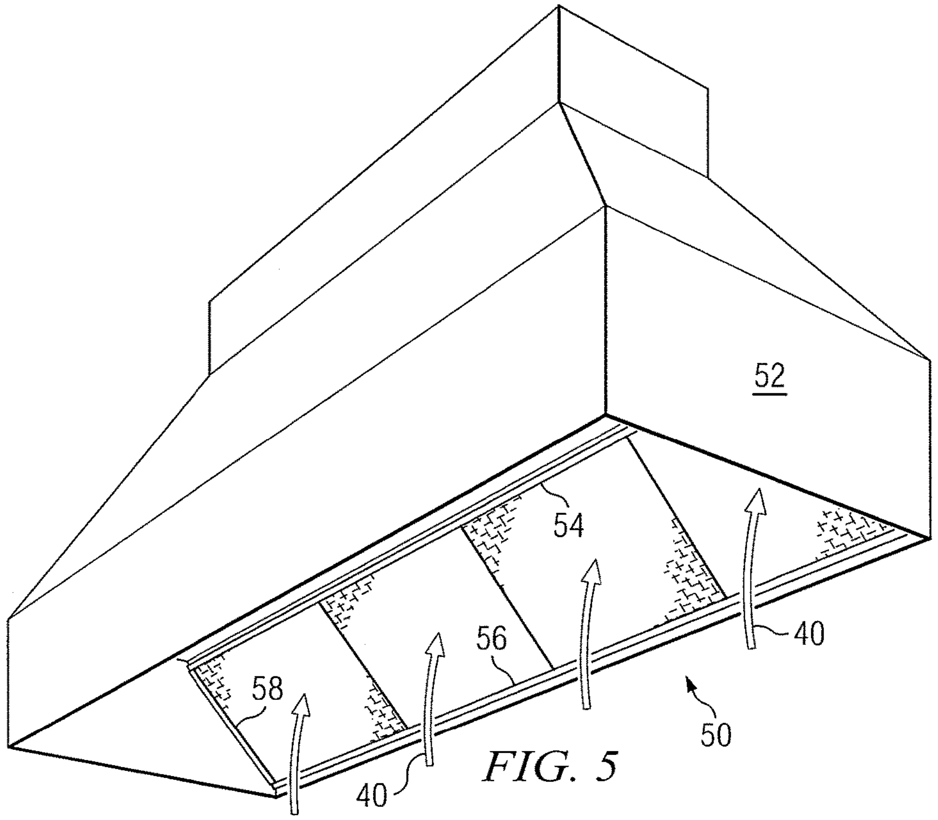
FIG. 5 illustrates a filter assembly, in accordance with a particular embodiment of the present disclosure, installed within a vent hood.
Figure 6:
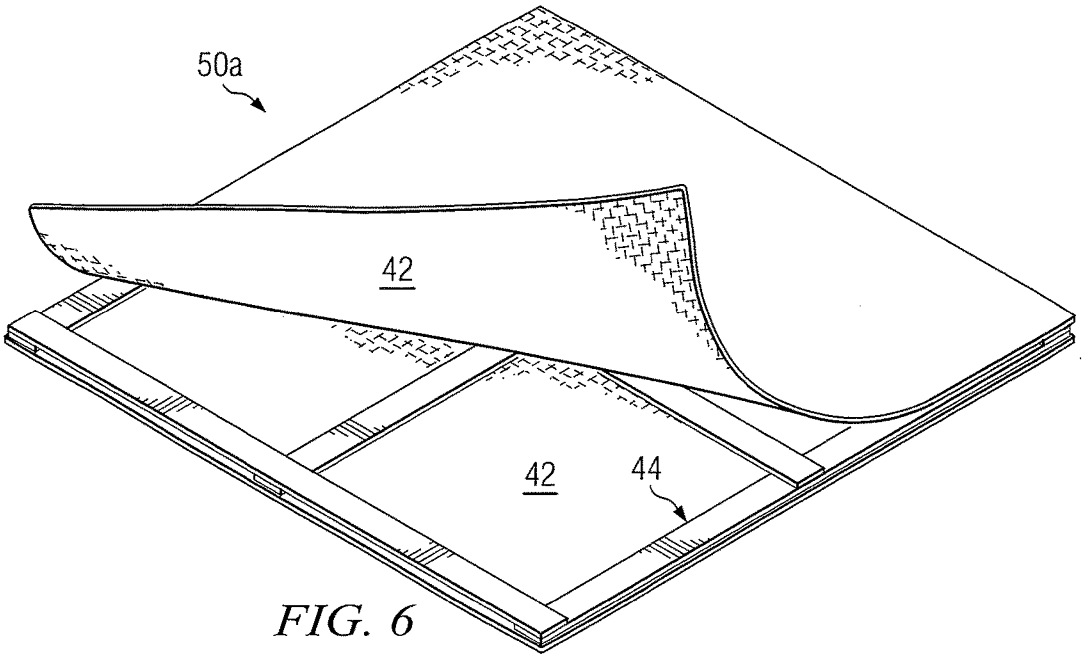
FIG. 6 illustrates a disposable grease removal device, in accordance with a particular embodiment of the present disclosure.
Figure 7:
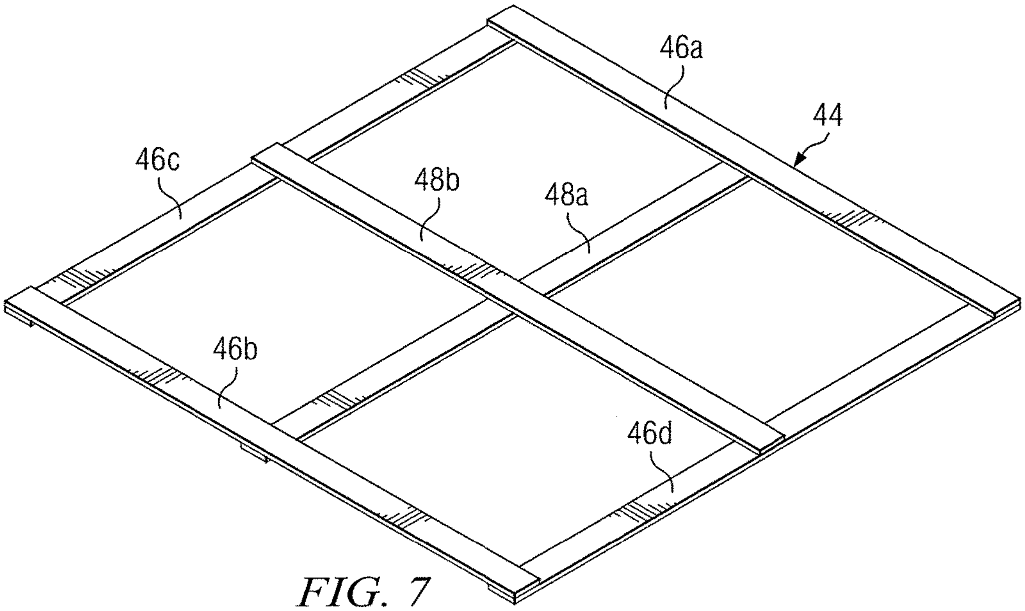
FIG. 7 illustrates a stabilizer that may be a part of the grease removal device of FIG. 6, in accordance with a particular embodiment of the present disclosure.

FIGS. 5-7 illustrate a particular embodiment DGRD 50, in more detail. DGRD 50 is installed within a vent hood 52. Vent hood 52 is configured and positioned such that air leaving a cooking area will pass through DGRD 50 before being exposed to (i) a baffle filter (not shown in FIG. 5) that may be positioned behind DGRD 50; and/or (ii) ductwork associated with vent hood 52 that is configured to remove the air from the cooking area (with or without an associated exhaust fan(s)). Vent hood 52 includes top and bottom filter clips 54 and 56, respectively, and side clips 58 that collectively secure a plurality of DGRDs 50 in place, and allow for simplified removal and/or replacement of DGRDs 50. A plurality of direction arrows 40 are provided in FIG. 5 to illustrate the direction of air flow.

The DGRD 50 includes two primary components, either or both of which may be formed from materials that allow for disposal of the DGRD after a single use: 1) a filter pad 42 that may be referred to herein as a grease collector pad, and 2) an internal stabilizer frame 44.

The grease collector pad 42 is one of the primary mechanisms that will capture and remove the grease particulates from the airflow. The fibers which make up the grease collector pad 42 are capable of collecting and holding grease particulates from the air that travels through the grease collector pad 42. In particular embodiments, the grease collector pad 42 may be formed principally from a mixture of flame resistant viscose fibers and wool fibers that are woven together, and bonded together with a bonding emulsion that may contain additional additives such as fire retardant, fire suppressant, anti-microbial, anti-bacterial, color dyes, etc.

The internal stabilizer frame 44 is designed to add structure and rigidity to the grease removal device. In the embodiment of FIG. 7, the internal stabilizer frame 44 has four sides 46 (top 46*a*, bottom 46*b*, left 46*c* and right 46*d*), vertical support 48*a*, and horizontal support 48*b*. In a particular embodiment, supports 48*a* and 48*b* may be approximately ¾" wide and approximately 0.125" thick. In another embodiment, the internal stabilizer frame 44 may also be made of practically any non-metallic material, for example a natural, bio-degradable material that is lightweight and flame-resistant. The internal stabilizer frame 44 could be made of practically any material that will pass any required regulatory codes. The stabilizer frame may also include any number of horizontal, vertical and/or diagonal supports of practically any size or configuration. Functionally, it is beneficial for the internal stabilizer frame 44 to add shape and structure to the DGRD with relatively little added weight and/or very little added static pressure.

The DGRD of FIG. 6 is generally formed by inserting the internal stabilizer frame 44 within or between two grease collector pads 42. In a particular embodiment, the internal stabilizer frame 44 may be coated with glue on both sides, which allows the internal stabilizer frame 44 and the grease collector pad 42 to be merged together into a single DGRD.

The DGRD can be manufactured using a variety of processes and alternative materials. Included herein is a description of various details related to how the two primary components of the DGRD can be produced. The two primary components noted above are the grease collector pad 42 and the internal stabilizer frame 44.

Figure 8:
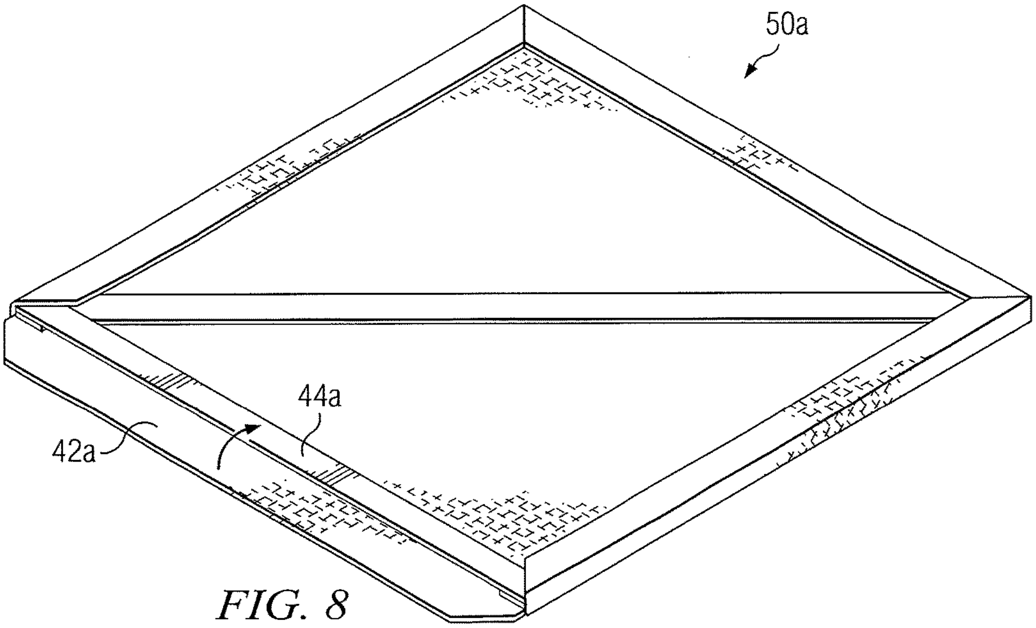
FIG. 8 illustrates an alternative embodiment disposable grease removal device.

FIG. 8 illustrates a DGRD 50*a*, in accordance with another embodiment of the present disclosure. DGRD 50*a* includes a grease collector pad 42*a* and an internal stabilizer frame 44*a*, that are similar to grease collector pad 42 and internal stabilizer frame 44 of FIG. 6. However, the method for manufacturing DGRD 50*a* would be slightly different. DGRD 50*a* is formed using a single grease collector pad 42*a* that is big enough to overlap internal stabilizer frame 44. Thus, at each edge of the internal stabilizer 44*a*, the grease collector pad is lapped over the internal stabilizer frame 44*a*. An optional diagonal support 46*e* is also included on the internal stabilizer frame.

Figure 9:
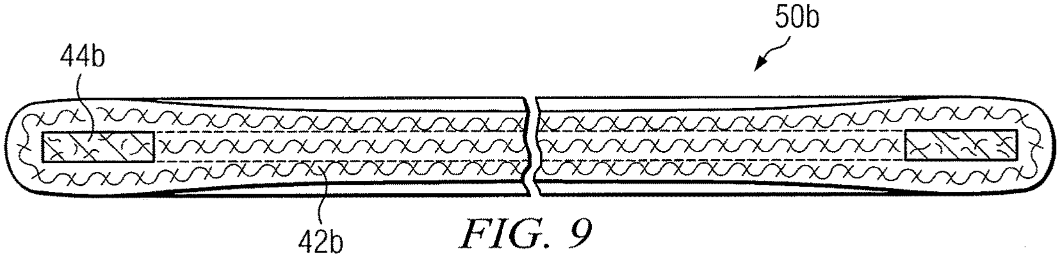
FIG. 9 illustrates a cross-section of yet another alternative embodiment disposable grease removal device.

FIG. 9 illustrates yet another DGRD 50*b*, in accordance with yet another embodiment of the present disclosure. DGRD 50*b* includes a single grease collector pad 42*b*. An internal stabilizer frame 44*b* is embedded within grease collector pad 42*b*, which is simply woven around internal stabilizer frame 44*b* to manufacture DGRD 50*b*.

Grease Collector Pad

The grease collector pads of this disclosure can be manufactured using one or more (e.g., a blend) of various fibers. For example, at least three different types of fibers may be used: (i) natural fibers, (ii) synthetic fibers, and/or (iii) hybrid fibers. For the purposes of this disclosure, "natural" fibers generally refers to fibers that are derived from nature and include wool (e.g., sheep's wool or any other animal hair), cotton, linen, hemp, manila, flax, plant fibers, jute sisal, etc. For the purposes of this disclosure, "synthetic" fibers generally refers to fibers that are man-made, and include nylon, polyester, acrylic, polypropylene, polyethylene, polystyrene, flame resistant modified acrylic, etc. For the purposes of this disclosure, "hybrid" fibers generally refers to fibers that are derived from nature but materially modified by man, and include viscose, rayon, PLA, PLA flame resistant polymers, biodegradable flame resistant polymers, flame resistant rayon, synthetic fiber derived from a natural source, fibers that are derived from corn starch, etc. Most of the above referenced fibers may also be used in a flame resistant form in which a flame resistant additive is impregnated into the fibers.

One particular embodiment of the present disclosure is a mixture of wool fibers and flame resistant viscose fibers. The blended fibers may be sprayed with a bonding emulsion that may be selected such that it is biodegradable. In various embodiments, the bonding emulsion may contain fire-resistant, fire-retardant and/or fire-suppressant ingredients, anti-microbial agents and a color dye mixed with it in any combination.

The grease collector pads may also be made using wool and flame resistant viscose blended in any ratio. For example, the ratio could be as much as 95% wool and 5% flame resistant viscose or as much as 95% flame resistant viscose and 5% wool. In general, practically any ratio of the blended flame resistant viscose and wool may be employed, within the teachings of the present disclosure. In other embodiments, the ratio could also be 100% flame resistant viscose or 100% wool fibers.

For example, the following describes blends that may be used in accordance with particular embodiments of the present disclosure:

- 50% wool and 50% 8-9 denier flame resistant viscose bonded with biodegradable flame resistant treated acrylic bonding emulsion (for purposes of this specification, "denier" is a unit of measurement of linear density of textile fiber mass, calculated as one gram per nine-thousand meters).
- 100% 8-9 denier flame resistant viscose bonded with biodegradable flame resistant treated acrylic bonding emulsion.
- 50% wool/25% 8-9 denier flame resistant viscose/25% 2 denier flame resistant viscose bonded with biodegradable flame resistant treated acrylic bonding emulsion.

In other embodiments, the viscose and/or flame resistant viscose may be provided within a range of 2-9 denier, or within a narrower range of 4-8 denier. In particular embodiments, it may be provided at 5 denier.

In addition, the wool or flame resistant viscose could be blended with other fibers that are natural, synthetic and/or hybrid fibers, which can impart flame resistant or structural properties to the resultant apparatus. This could include rayon, flame resistant rayon, flame resistant modified acrylic, PLA flame resistant polymers, biodegradable flame resistant polymers, plant fibers or flame resistant natural fibers derived from plant fibers i.e. jute, flax, hemp, sisal, cotton, manila. In accordance with another embodiment, wool and viscose may be blended in any percentage then treated with a fire retardant that would impart fire retardant properties to the wool and viscose blend. This could also be a blend of any natural or synthetic fibers blended in any percentage which could be treated with a flame resistant compound to make the overall blend flame resistant.

In accordance with a particular embodiment, the wool/flame resistant viscose may be treated with flame retardant and/or flame suppressant compounds to improve the heat and flame resistance of the resulting pad. Alternatively, the process may omit flame resistant and/or flame suppressant treatment as it is determined by testing of the various blends to heat and flame for a particular application.

The flame resistant viscose fiber is relatively heat and flame resistant and will only degrade under extreme conditions of heat and flame. For this reason, flame resistant viscose fibers are used extensively in clothing for firemen, welders, military and others that are exposed to severe heat and/or flame. This may be important given that the DGRD is often installed above deep-fat fryers, grills, griddles and ovens in the kitchen where excess heat and flame can occur. Flame resistant viscose fibers being blended into the grease collector pad 42 may significantly improve heat and flame resistance properties of the DGRD.

While wool is naturally flame resistant, in an open structure the wool fibers may be exposed to higher concentrations of oxygen in certain conditions. For this reason, a flame retardant and/or fire suppressant may be applied in accordance with particular embodiments. However, with the flame resistant viscose or other similar fiber it may not be required, or may be required in smaller concentration, depending on the planned application.

Flame resistant viscose fibers capture grease and contaminants from grease laden vapor. Therefore, when used in combination with wool fibers there is very similar grease capturing ability, but, with the added benefit of more robust performance against heat and flame.

In accordance with particular embodiments of this disclosure, the bonding emulsion may be used to provide a way to apply the fire-retardant/suppressant compounds or any other additives such as color dyes, anti-bacterial, antimicrobials, etc. The bonding emulsion may also be used to bond the blended fibers together in the desired shape. The bonding emulsion may be designed so that it will break down over time when the DGRD is disposed of after use (i.e., is biodegradable).

Wool fibers are bio-degradable and the flame resistant viscose fibers may be made from wood pulp and/or in such a way that it is 100% bio-degradable. Hence, the resulting grease collector pad 42 using this blend of material and bonding emulsion may be fully biodegradable and as such can be easily disposed of without effecting the environment.

The bonding emulsion, in particular embodiments, is made from biodegradable components comprising a blend of acrylic co-polymers. It may also be made with other natural occurring and biodegradable binders such as starch and protein adhesives. Synthetic bonding components which have biodegradable properties including, but not limited to, PLA (Polylactic acid) may also be used. Ultra-sound and/or Hydrogen-bonding may also be a used as a bonding method.

In accordance with a particular embodiment, the grease collector pad 42 may be formed from a 50% blend of fire-resistant 5-denier×64 mm flame resistant viscose and 50% of fibers comprised of 100% lamb's wool. The lamb's wool may be clean, scoured 28 micron wool in 1 to 3 inch lengths. A single grease collector pad 42 in this embodiment may have a weight of approximately 100 grams per square meter and a loft of approximately 8 mm.

Following is a discussion of various manufacturing processes that could be used to produce the grease collector pad 42, in accordance with particular embodiments of the present disclosure.

The scoured wool may be "opened" to enable easier processing. The wool may then be blended with the flame resistant viscose or similar fiber as a pre-blend, and transferred to be put through a non-woven carding machine which further opens and generally aligns the blended fibers. The card may be used to make the fiber blend into a fiber web which may then be layered using a cross lapping machine into a blended fiber wadding. If a grid or mesh was to be introduced it would feed into the blend at the cross lapper of a roll. The lapping and carding may be used to ensure the fibers are aligned correctly so that when the fiber wadding is sprayed with binder that the final grease collector pad 42 will have sufficient, predetermined minimum loft.

The wool/flame resistant viscose blend may also be needle punched into a non-woven blanket. Other non-woven process such as needling, thermo-bonding, ultra-sound, air laid, spun bond or other non woven technology may be used to form the wadding/blanket.

At this stage the bonding emulsion may be applied by spraying the top and the bottom of the wadding with the spray mix. The emulsion is applied in a diluted form to allow penetration through the wadding. Vacuum is applied below the wadding to further assist the penetration of the fiber with the bonding emulsion. The bonding emulsion may be used to apply the other additives such as fire retardants, fire suppressants, anti-microbial agents, anti-bacterial agents, color dyes, etc. so the solution should be applied relatively evenly and in the correct, predetermined proportions.

As the thickness of the wadding and grams per square meter can vary, the amount of bonding emulsion will also vary, so that it matches what is desired to sufficiently bond the grease collector pad 42 and impart the desired physical and fire resistant properties.

The spray bonded wadding may then be passed through an oven at over 280 F to drive off the water and cure the bonding resins. The resultant wadding may then be rolled into rolls and allowed 24 hours to cure and the binder to be fully effective. During this time the wool absorbs moisture from the atmosphere. The resultant wadding may then be made into rolls cut at specific widths and lengths.

The grease collector pad 42 media could be made as a flat sheet or it could be folded into pleats. The use of pleats may provide additional capture capacity due to the pleats resulting in more surface area for capacity available within the same area.

Internal Stabilizer Frame

One function of the internal stabilizer frame is to provide dimensional structure and rigidity to the DGRD. The internal stabilizer frame, in a particular embodiment, may be made from fire-resistant fiberboard (e.g., that is 0.125" thick) and can be either die-cut or cut into individual strips and assembled into the required shape, and may include any combination of diagonal, vertical or horizontal support members. Alternative materials may also be non-woven 100% flame resistant viscose fibers which have been needle punched so that it has the consistency of thick cardboard and as such can be used to make the internal stabilizer frame. The flame resistant viscose is flame resistant. The non-woven flame resistant viscose could then be cut into strips and assembled or die-cut into the shape required for each internal stabilizer frame with any combination of vertical, horizontal or diagonal support members.

Other materials that could be used to make the internal stabilizer frame include flame resistant treated jute or Sisal fiber or flame resistant treated plastics and polymers.

Assembly of the DGRD

The DGRD is formed when the grease collector pad and the internal stabilizer frame are merged together to create a single unit. In a particular embodiment the assembly process includes inserting the internal stabilizer frame between two grease collector pads. In particular embodiments, both sides of the internal stabilizer frame may be coated with a glue which results in the components being held firmly together when pressure is applied to the unit to compress the assembly. In the embodiment described above, the DGRD may weigh approximately 250 grams per square meter ("gsm") with a loft of approximately 22-25 mm. In other various embodiments, the DGRD can vary in weight from 50 gsm to 750 gsm. The weight used is a dry mass weight based on the production weight of the grease collector pad when they come off of the production line. The resultant grease collector pad assembly may have a dry loft of 5 mm to 55 mm.

Alternative Embodiments

The DGRD may be made in other shapes and sizes using the same primary ingredients as the embodiments described above. For example, the following is an alternative method of design for the DGRD that may use some or all of the same materials but assembles them with the internal stabilizer frame disposed upon the exterior of the fiber media.

The internal stabilizer frame cartridge or frame panel may be made by using a fire resistant stiff material and die cutting it into a frame with diagonal and/or horizontal support members. The fiber media comprising the wool/flame resistant viscose blanket may be bonded to the inside perimeter of the external frame using glue providing a continuous and positive seal.

The fiber media may be installed as a flat sheet in the enclosure frame or it could be folded into pleats. The pleats may need to be supported with a grid made from any natural or synthetic material which exhibits fire resistant properties. It may also be expanded metal but this has the disadvantage of not being biodegradable. Natural grids or meshes could include flame resistant viscose, flame resistant treated jute or Sisal fiber or flame resistant treated plastics and polymers. The pleats per linear foot would vary depending on the thickness of the fiber media. Alternatively the fiber media could be a flat sheet with no pleats.

Another method to add support to the fiber media would be to include a mesh or grid in the non woven manufacture. The grid or mesh may be inserted in the middle of the wool/flame resistant viscose blend during manufacture. This would mean the fiber blend itself would offer flame resistance and heat protection to any grid or mesh used. So it's possible the grid or mesh used may not need to be flame resistant. The die cut material could be non-woven flame resistant viscose as this has excellent strength and excellent flame and heat resistance. It is also biodegradable. However the die cut material may also be formed from any natural or synthetic material particularly if they have biodegradability and flame resistant properties. Even flame resistant treated cardboard could possibly be used in the manufacture of the die cut support.

The structure and support need not only be die cut. It could be welded supports, or supports fixed to the fiber media directly or injection molded plastic or extruded plastic profiles or any combination of these construction methods. The fiber media could also be made to be more rigid during the manufacturing process by varying the composition of the fibers and the density, varying the non woven by needling or other non woven process or the application and type of bonding emulsion and varying the curing temperature or any combination of these. This could enable the fiber media to be produced into a pleated pad without the need for additional support with an expanded mesh or grid.

The die-cut external internal stabilizer frame may be made from non woven 100% flame resistant viscose which has been needle punched so that it has the consistency of thick cardboard and as such can be used to make the support frame. The flame resistant viscose is flame resistant. The non-woven flame resistant viscose is die cut into the shape required for each grease collector pad with diagonal and horizontal support members. To complete the cartridge up to 2 die cut frames may be required. Effectively a front and back side of the internal stabilizer frame. The wool/flame resistant viscose media may then be cut into the size required to fit the support frame. If the media is to be pleated it will have to be cut to a larger size to allow for the additional requirement due to the pleats. This will vary depending on the number of pleats per linear meter and the depth of the internal stabilizer frame. At this stage, if an extra supporting grid or mesh is required it can be adhered to the fiber media by some type of flame resistant adhesive. Alternatively it could be stitched or sewn in place with flame resistant thread. The die cut support frames are then assembled using flame resistant adhesive ready for the fiber media to be added. The fiber media pack comprising the wool/flame resistant viscose, pleated or not (e.g., flat sheet) which is then bonded with a flame resistant glue to the inside perimeter of the enclosure frame, providing a continuous and positive seal.

The resulting DGRD cassette is then quality inspected and is ready for installation and use. The DGRD may be supplied as panels and cassettes which are ready to install.

The DGRD may then be installed in hoods and exhaust units in kitchens and food preparation areas. The grease collector pad will effectively capture the grease and other contaminants. In some embodiments, the hoods or exhaust hoods will need to have a simple bracket (e.g., Z bracket) or similar installed to support the DGRD.

The cassettes are then placed in the brackets in the hoods in front of the flame baffles. A tool with an extension arm may be used to mount or replace DGRD. Sufficient DGRD's should be installed to cover the hood aperture and the DGRD's may be butted up against each other to form an effective seal.

When one or all of the DGRD's is full of grease, it's a simple matter to remove them and install a replacement.

DGRD Performance

In particular embodiments, the DGRD may have improved performance relative to existing filter systems, in collecting grease in various particulate sizes as per testing that may be done using the ASTM F-2519A standard.

In such embodiments, the DGRD may have larger grease capacity than other fiber filters available and even with the higher grease holding capacity the resulting static pressure increase of the DGRD may be less than other fiber-based filters. This results in kitchen hoods being able to run efficiently without the need to add larger motors. When the DGRD is full it may simply be replaced with a new DGRD and the soiled pad can be disposed of in an environmentally friendly manner. The DGRD may be made in such a way that it can be fully bio-degradable and may breakdown 100% in a landfill in less than 12 months.

Mounting Brackets

Mounting brackets may also be provided as part of the DGRD. They can be formed of practically any material that will support the weight of the DGRD and hold the DGRD firmly in place within the exhaust hood. In accordance with a particular embodiment of the present disclosure, to meet various codes and regulations governing exhaust hoods, the mounting brackets may be comprised of Stainless Steel and/or another non-combustible material. The mounting brackets may be designed to practically any shape to hold the DGRD in place and maintain a sufficient seal within the hood aperture. In particular embodiments of the present disclosure, the mounting brackets may be made of Stainless Steel and formed into the shape of "Z" or "U" to hold the DGRD in place, and allow for simplified removal and/or replacement of DGRDs.

Installation/Removal Tool

An installation/removal tool may also be provided as part of the DGRD System. The installation/removal tool may be used to allow an operator to effectively reach the DGRD when installed within the exhaust hood, without having to climb onto the cooking equipment. The installation/removal tool may be comprised of lightweight aluminum or plastic as the weight of the DGRD does not require a particularly "heavy-duty" material. However, practically any material can be used to make the installation/removal tool that is strong enough to hold the DGRD. The end of the mounting tool includes a plurality of prongs which are used to slightly pierce the front of the DGRD to grab the internal stabilizer frame 44 for lifting and inserting the DGRD into the mounting brackets for installation. For DGRD removal, the prongs on the end of the installation/removal tool are used to pierce completely through grease collector pad 42 and simply lift and remove from the mounting brackets.

The present disclosure is generally directed to a removable and/or disposable grease removal device that is placed between the cooking surface and the baffle filters described herein, to capture grease particulates from grease laden vapors prior to entry into, or "upstream" from the baffle filters described herein. It should be noted that existing grease removal devices are typically located "downstream" of baffle filters.

The present disclosure is generally directed to a removable and/or disposable filter assembly that is placed between the cooking surface and the baffle filters disposed within a vent hood described herein, to capture grease and/or other particulates from grease laden vapors prior to entry into, or "upstream" from the baffle filters described herein.

Although an embodiment of the disclosure has been described using specific terms, such description is for illustrative purposes only. The words used are words of description rather than of limitation. It is to be understood that numerous changes, substitutions, variations, alterations, transformations, and modifications may be made by those of ordinary skill in the art without departing from the spirit and scope of the present disclosure, which is set forth in the following claims. Therefore, the spirit and scope of the appended claims should not be limited to the description of the embodiments disclosed therein.

What is claimed is:

1. A kitchen vent hood filter assembly, the filter assembly comprising:

a filter pad comprising oleophilic fibers and viscose fibers, wherein:

the filter pad is formed through at least one of thermobonding, air-laid, and spunbond;

approximately 25% of the viscose fibers have a linear density between between 8-9 denier;

approximately 25% of the viscose fibers have a linear density of approximately 2 denier;

the viscose fibers comprise approximately 50% of the fibers of the filter pad; and the oleophilic fibers comprise approximately 50% of the fibers of the filter pad;

a bonding emulsion; and a structural support providing support to the filter pad to maintain the filter pad in a generally flat configuration and to allow installation of the filter pad within a ventilation hood.

2. The filter assembly of claim 1, wherein at least a portion of the viscose fibers of the filter pad are blended with synthetic fibers.

3. The filter assembly of claim 1, wherein at least a portion of the viscose fibers of the filter pad are blended with wool fibers.

4. The filter assembly of claim 1, wherein the bonding emulsion comprises at least one of: casein resin, acrylic resin, starch, protein, and polylactic acid.

5. The filter assembly of claim 1, wherein the structural support comprises supports extending between opposite sides of the filter pad.

6. The filter assembly of claim 1, wherein the structural support comprises a biodegradable material that is fire resistant.

7. The filter assembly of claim 1, wherein the structural support is disposed around adjacent edges of the filter pad and not in a middle portion of the filter pad.

8. The filter assembly of claim 1, wherein the oleophilic fibers of the filter pad are wool fibers.

9. The filter assembly of claim 1, wherein at least a portion of the filter pad is treated with a solution that is fire resistant or fire retardant.

10. The filter assembly of claim 1, wherein the filter assembly has a total dry weight approximately between 50 grams per square meter to 500 grams per square meter.

11. The filter assembly of claim 1, wherein the filter assembly has a dry loft of approximately between 5 mm and 50 mm.

12. The filter assembly of claim 1, wherein:

the viscose fibers are flame resistant;

the viscose fibers are fire retardant; or the viscose fibers are treated with a solution that is fire resistant or fire retardant.

13. A method of manufacturing a kitchen vent hood filter assembly, comprising:

forming a filter pad comprising oleophilic fibers and viscose fibers, wherein:

the filter pad is formed through at least one of thermobonding, air-laid, and spunbond;

approximately 25% of the viscose fibers have a linear density between 8-9 denier;

approximately 25% of the viscose fibers have a linear density of approximately 2 denier;

the viscose fibers comprise approximately 50% of the fibers of the filter pad; and the oleophilic fibers comprise approximately 50% of the fibers of the filter pad;

applying a bonding emulsion to the filter pad; and securing the filter pad to a structural support, the structural support configured to provide support to the filter pad to maintain the filter pad in a generally flat configuration and to allow installation of the filter pad within a ventilation hood.

14. The method of claim 13, wherein the viscose fibers of the filter pad are blended with wool fibers.

15. The method of claim 13, wherein the viscose fibers of the filter pad are blended with synthetic fibers.

16. The method of claim 13, wherein the bonding emulsion comprises at least one of: casein resin, acrylic resin, starch, protein, and polylactic acid.

17. The method of claim 13, wherein the structural support comprises supports extending between opposite sides of the filter pad.

18. The method of claim 13, wherein the structural support comprises a biodegradable material that is fire resistant.

19. The method of claim 13, wherein the structural support is disposed around adjacent edges of the filter pad and not in a middle portion of the filter pad.

20. The method of claim 13, wherein the oleophilic fibers of the filter pad are wool fibers.

21. The method of claim 13, further comprising treating at least a portion of the filter pad with a solution that is fire resistant or fire retardant.

22. The method of claim 13, wherein the filter assembly has a total dry weight approximately between 50 grams per square meter to 500 grams per square meter.

23. The method of claim 13, wherein the filter assembly has a dry loft of approximately between 5 mm and 50 mm.

24. The method of claim 13, wherein:

the viscose fibers are flame resistant;

the viscose fibers are fire retardant; or the viscose fibers are treated with a solution that is fire resistant or fire retardant.

* * * * *